(12) United States Patent
Jain et al.

(10) Patent No.: US 12,455,854 B2
(45) Date of Patent: Oct. 28, 2025

(54) CLOUDCACHE IMPLEMENTATION FOR AN OBJECT STORAGE-BASED FILE SYSTEM

(71) Applicant: Druva Inc., Santa Clara, CA (US)

(72) Inventors: Somesh Jain, Maharashtra (IN); Rohit Singh, Uttar Pradesh (IN); Shubham Agarwal, Rajasthan (IN); Saurabh Bhavsar, Maharashtra (IN)

(73) Assignee: Druva Inc., Santa Clara, CA (US)

( * ) Notice: Subject to any disclaimer, the term of this patent is extended or adjusted under 35 U.S.C. 154(b) by 0 days.

(21) Appl. No.: 18/413,735

(22) Filed: Jan. 16, 2024

(65) Prior Publication Data

US 2024/0256394 A1    Aug. 1, 2024

(30) Foreign Application Priority Data

Jan. 20, 2023 (IN) .............................. 202341004081

(51) Int. Cl.
*G06F 16/11* (2019.01)
*G06F 16/172* (2019.01)
*G06F 16/178* (2019.01)

(52) U.S. Cl.
CPC .......... *G06F 16/125* (2019.01); *G06F 16/172* (2019.01); *G06F 16/178* (2019.01)

(58) Field of Classification Search
CPC ..... G06F 16/125; G06F 16/172; G06F 16/178
See application file for complete search history.

(56) References Cited

U.S. PATENT DOCUMENTS

| | | | |
|---|---|---|---|
| 9,298,723 B1* | 3/2016 | Vincent | G06F 16/183 |
| 10,263,947 B2* | 4/2019 | Vats | H04L 9/088 |
| 10,505,941 B2* | 12/2019 | Vats | H04L 63/0281 |
| 10,567,364 B2* | 2/2020 | Vats | H04L 63/08 |
| 10,831,789 B2* | 11/2020 | Srinivasan | H04L 63/0815 |
| 10,936,412 B1* | 3/2021 | Visvanathan | G06F 12/0866 |
| 11,726,696 B2* | 8/2023 | Nehra | G06F 11/1464 711/162 |
| 11,941,280 B2* | 3/2024 | Nehra | G06F 11/1469 |
| 2021/0064485 A1* | 3/2021 | Rana | G06F 11/1464 |
| 2021/0081232 A1* | 3/2021 | Khalid | G06F 9/45558 |
| 2021/0303528 A1* | 9/2021 | Meister | G06F 16/162 |
| 2022/0335027 A1* | 10/2022 | Subramanian Seshadri | G06F 16/24573 |

\* cited by examiner

*Primary Examiner* — Miranda Le
(74) *Attorney, Agent, or Firm* — IceMiller LLP (57) ABSTRACT

The present invention discloses a file storage system including an object storage for storing data blocks for a client, a merge index database to store metadata corresponding to the stored data blocks using a merge index, a cloudcache located on a premise of the client, and a cloudcache implementation module communicatively coupled to the object storage, the cloudcache and the merge index database. The cloudcache implementation module facilitates data backup and restore operations for the client in accordance with a data retention policy, where one or more data blocks are stored on the cloudcache and a sync operation is performed between the cloudcache and the object storage. A backup of the data blocks is performed to the cloudcache in a backup operation, data blocks are compacted, and a restore operation for data blocks stored on the cloudcache are performed in accordance with the data retention policy.

3 Claims, 6 Drawing Sheets

CLOUDCACHE IMPLEMENTATION FOR AN OBJECT STORAGE-BASED FILE SYSTEM

PRIORITY STATEMENT

The present application claims priority under 35 U.S.C. § 119 to Indian patent application number 202341004081 filed 20 Jan. 2023 the entire contents of which are hereby incorporated herein by reference.

BACKGROUND

Embodiments of the present disclosure generally relate to storage services or storage techniques, and more particularly to a method and system for an object storage-based file system.

Modern businesses often rely on computer systems and computer networks. It is undesirable to experience an irretrievable loss of data in such business computer systems. To prevent loss of data, computer systems are periodically backed up using a data backup file system configured to store the backup data on a storage system (e.g., a cloud-based storage). Backup data includes data blocks and metadata. For generating data blocks source data is split into chunks and stored on the storage server (e.g., a cloud storage). The metadata is the additional information maintained to allow restore of backed up data back into its original form.

Typical data backup systems employ snapshots where each snapshot refers to a consistent view of the file system at a specific point of time. However, storing multiple snapshots in the system increases the amount of data stored in the file system. The amount of data stored in the file system is proportional to the number of snapshots stored. Moreover, it may take substantial time for running backup and restore workflows for the storage system.

Accordingly, there is a need for an efficient cloudcache based method and system for handling or managing an object storage-based file system, that facilitates backup and restore workflows and reduces the overload in transferring data along with reduced usage of network resources and time.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an embodiment, a file storage system is disclosed. The file storage system includes an object storage to store data blocks for a client, a merge index database to store metadata corresponding to the stored data blocks using a merge index, a cloudcache located on a premise of the client, and a cloudcache implementation module communicatively coupled to the object storage, the cloudcache and the merge index database. The cloudcache implementation module is configured to facilitate data backup and restore operations for the client, in accordance with a data retention policy. The cloudcache implementation module is further configured to store one or more data blocks on the cloudcache and perform a sync operation between the cloudcache and the object storage as per a sync schedule. The cloudcache implementation module is further configured to perform a backup of the data blocks to the cloudcache during a backup operation to retain one or more data blocks in accordance with the data retention policy. Further, the cloudcache implementation module is configured to compact data blocks that have expired in accordance with the data retention policy, perform a restore operation to download one or more data blocks stored on the cloudcache, and identify data blocks that are not stored on the cloudcache and download the identified data blocks from the object storage.

In another embodiment, a cloudcache implementation module for an object storage-based file system of a client is disclosed. The cloudcache implementation module includes a memory storing one or more processor-executable routines, a processor communicatively coupled to the memory, and configured to execute the one or more processor-executable routines to perform the following steps. The processor is configured to access an object storage having plurality of consistency sets (Cset), each Cset having snapshots of the file system. Each snapshot comprises one or more data blocks. Further, the processor is configured to access a cloudcache located on premises of the client and to receive an instruction to implement a workflow between the object storage and the cloudcache. The workflow is selected to facilitate one of data backup, data restore, cloud sync and data compaction between the object storage and the cloudcache. Further, the processor is configured to access one or more entities corresponding to the plurality of Csets. The one or more entities comprise Cset index, a cloudcache index and a deduplication index, wherein each of the Cset index, cloudcache index and deduplication index has a plurality of metadata records. Further, the processor is configured to implement the identified workflow between the object storage and the cloudcache using the Cset index, cloudcache index and the deduplication index in accordance with a data retention policy of the client.

In another embodiment, a method for implementing a data workflow between a file storage system and a cloudcache located on a client premise is disclosed. The method includes, accessing an object storage having plurality of consistency sets (Cset), each Cset having snapshots of the file system. Each snapshot comprises one or more data blocks. The method includes accessing a cloudcache located on premises of the client and receiving an instruction to implement a workflow between the object storage and the cloudcache. The workflow is selected to facilitate one of data backup, data restore, cloud sync and data compaction between the object storage and the cloudcache. The method also includes accessing one or more entities corresponding to the plurality of Csets, and where the one or more entities comprise Cset index, a cloudcache index and a deduplication index, and where each of the Cset index, cloudcache index and deduplication index has a plurality of metadata records. The method further includes implementing the identified workflow between the object storage and the cloudcache using the Cset index, cloudcache index and the deduplication index in accordance with a data retention policy of the client.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figures. It should also be noted that in some alternative implementations, the functions/actions/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide a cloudcache implementation for an object storage-based file system collectively referred to herein as a "file storage system". In the illustrated embodiments, the cloudcache is typically located within a client premise and may be scalable, performant and cost effective compared to the current storage architectures.

In general, a storage service such as an object storage is designed as a standard backend for data storage requirements of a plurality of products. As referred herein, cloudcache is an on-premise software appliance for caching data blocks locally. Furthermore, there are multiple workflows associated with the cloudcache that facilitate clients to perform backup and restore operations as will be described below.

In this embodiment, the object storage is configured to store a plurality of file systems and files. Each file stored in the storage system includes data blocks and metadata associated with the files. The data blocks are stored on the object storage (e.g., AWS S3). The metadata may be stored in a key-value database (e.g., NoSQL or the like) and/or a merge index implemented on the object storage. In order to speed up the backup and restore workflows, a cloudcache implementation is disclosed. Typically, the cloudcache is installed within a client premise. The data blocks stored on the cloudcache are also synced to object storage (e.g., AWS S3) in non-core hours. Based on a client retention policy, the data blocks may be removed/compacted from the cloudcache to make space for new blocks. The proposed method and system describe different workflows related to cloudcache like backup, restore and cloudsync workflows.

Additional details about certain parameters and implementations such as object storage based indexing systems, data compaction and data restore referenced below are available in U.S. patent application Ser. No. 18/095,818 filed on Jan. 11, 2023, entitled "Object Storage-Based Indexing Systems and Method", U.S. patent application Ser. No. 18/095,825, filed on Jan. 11, 2023, entitled "Data Compaction Systems and Method" and U.S. patent application Ser. No. 18/096,077, filed on Jan. 12, 2023, entitled "Systems and Method for Indexing and Data Compaction", the content of which are incorporated herein by reference in its entirety unless directly contradictory to the embodiments described herein.

Figure 1:
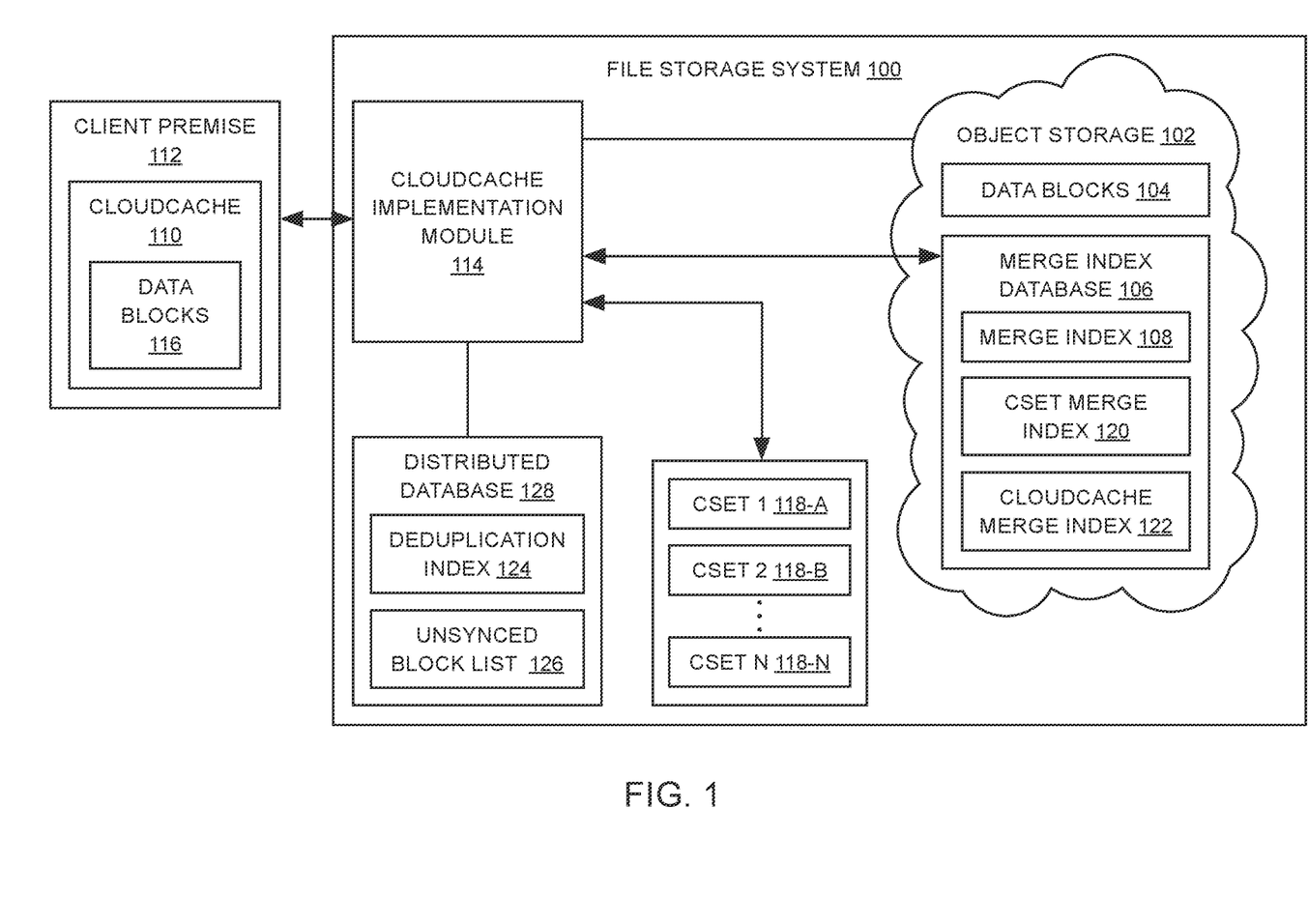
FIG. 1 is a schematic block diagram of a file storage system, according to some aspects of the present description.

FIG. 1 illustrates a block diagram of a file storage system (100). The file storage system (100) includes an object storage (102) and a cloudcache implementation module (114). The file storage system (100) is communicatively coupled to a cloudcache (110) that is implemented on a client premise (112). As shown, the object storage (102) includes stored data blocks (104) for a client, a merge index database (106) that includes a merge index (108), a consistency set (Cset) merge index (120) and a cloudcache merge index (122). In an embodiment, the system further includes a distributed database 128 that includes an unsynced block list (126) and deduplication index (124). The system 100 further includes a plurality of consistency sets (Csets) such as generally represented by (Cset1 (118a), Cset 2 (118b) . . . Csetn (118n)).

The merge index database (106) typically stores metadata corresponding to the stored data blocks (104) using a merge index (108). The cloudcache implementation module (114) is communicatively coupled to the object storage (102), the cloudcache (110) and the merge index database (106). The cloudcache implementation module (114) is configured to facilitate data backup and restore operations for the client in accordance with a data retention policy. The data retention policy may be defined by the client and can be changed from time to time. The cloudcache implementation module (114) is further configured to store one or more data blocks (116) on the cloudcache (110) and perform a sync operation between the cloudcache (110) and the object storage (102) as per a sync schedule. In some embodiments, the sync operation may be performed during non-core operation hours. Further, the cloudcache implementation module (114) is configured to perform a backup of the data blocks (104) to the cloudcache (110) during a backup operation to retain one or more data blocks (116) in accordance with the data retention policy. The cloudcache implementation module (114) facilitates the backup and restore operations between the cloudcache (110) and the object storage (102).

Further, the cloudcache implementation module (114) is configured to compact data blocks that have expired in accordance with the data retention policy. The cloudcache implementation module 114 is further configured to perform a restore operation to download one or more data blocks (116) stored on the cloudcache (110). The cloudcache implementation module (114) is further configured to identify data blocks that are not stored on the cloudcache (110) and download the identified data blocks from the object storage (102).

In an embodiment, the file storage system (100) includes data blocks of the plurality of consistency sets (Cset) (118a-118n), each consistency set having a plurality of snapshots of the file system at different points in time. Each consistency set (Cset) is attached to the cloudcache implementation module (114) in accordance with the data retention policy. Further, the plurality of consistency sets may have different data retention policies that are attached to a single cloudcache implementation module (114). Further, each of the plurality of Csets (e.g. 118a) is associated with a corresponding Cset merge index (120), and each of the plurality of Csets is associated with the same cloudcache merge index (122).

In operation, the cloudcache implementation module (114) is configured to implement a backup workflow as described below. The cloudcache implementation module (114) receives data blocks corresponding to one or more files and identifies if each of the received data blocks is a fresh block or a deduplication (dedup) block using the deduplication index (124). Typically, the deduplication index (124) comprises information about whether data blocks are present on the cloudcache (110) or the object storage (102). The cloudcache implementation module (114) assigns a new handle for identified fresh data blocks, and uploads data for the data blocks (116) against corresponding handles on the cloudcache (110). The cloudcache implementation module (114) is further configured to create handle references and handle info state in the cloudcache merge index (122) for each of the fresh and dedup blocks. In an embodiment, the cloudcache merge index (122) comprises a Handle Cset reference, a Cset Handle reference, a Handleinfo state or a combination thereof. Other references may be envisaged. In certain embodiments, the cloudcache implementation module (114) is further configured to create an entry for the fresh block in deduplication index as present on cloudcache (110).

Further, the cloudcache implementation module (114) is configured to create an unsynced block list (126) for all handles that are uploaded to the cloudcache (110). The cloudcache implementation module (114) implements a restore workflow to receive one or more folders and their corresponding files along with a block map for a restore operation. Here, the cloudcache implementation module (114) is configured to identify if each of the received data blocks is present on the cloudcache (110) or the object storage (102) based upon the deduplication index (124), and download identified data blocks from the cloudcache (110) or the object storage (102).

In an embodiment, the cloudcache implementation module (114) is configured to implement a cloudsync workflow as described below. The cloudcache implementation module (114) reviews the unsynced block list (126) for all handles to determine if one or more data blocks (104) are available on the object storage (102) based on a handle record in deduplication index (124). The cloudcache implementation module (114) further uploads the data block to the object storage (102) if the data block is determined as not available on the object storage (102), and also updates the handle record in deduplication index (124) as present on the object storage (102) and deletes an unsynced block record for the corresponding handle if the data block is unavailable on the object storage (102). Further, the cloud implementation module (114) is configured to delete the unsynced block record for the handle for data blocks that are determined to be available on the object storage (102).

In an embodiment, the cloudcache implementation module (114) is configured to implement a cloudcache compaction workflow as follows. The cloudcache implementation module (114) identifies one or more handles for compaction in each Cset using a Cset retention threshold and creates a delete record for the corresponding Cset in Cloudcache merge index (122). The cloudcache implementation module (114) is further configured to delete the identified blocks if it is determined that the blocks are synced to the object storage (102).

In an embodiment, the cloudcache implementation module (114) is configured to implement a block compaction as follows. The cloudcache implementation module (114) is configured to identify one or more data blocks present in retired snapshots of the file storage system (100) and delete the identified data blocks in object storage (102). The cloudcache implementation module (114) further updates handle info of the identified data blocks as purged in the cloudcache merge index (122) and removes the data blocks marked as purged from the cloudcache (110).

In an embodiment, a workflow for block expiry is explained further. Generally, a data block on the cloudcache (110) may be referred by one or multiple Csets (such as represented by reference numerals 118a-118n). Each Cset may have a retention threshold of a predefined time period. For a block to be retained on the cloudcache it needs to be present in at least one snapshot that is within the retention threshold. In case the data block is not present in any snapshot within the retention threshold, then such data block is removed from the cloudcache (110). In this scenario, as the data block is still relevant and it can be restored for all snapshots present on the object storage (102).

In this example, the workflow for block expiry includes Cset compaction and cache compaction. In Cset compaction, for each Cset, a list of handles or data blocks is traversed along with cset-handle index in the cloudcache merge index (122) Within a Cset, an inquiry is performed to determine if the data block is part of a snapshot that is within the retention threshold. In case, it is determined that the data block is not a part of the snapshot and present on cloudcache 110 as per the Cset-handle index, then for a corresponding handle a delete record is added corresponding to the Cset in handle-Cset index and Cset-handle index in the cloudcache merge index (122).

In cache compaction operation, a handle-Cset index is traversed in the cloudcache merge index (122). For each handle, a list of Cset and their create and delete records are checked. If it is determined that a Cset has only a create record it implies that the block is still relevant and should be retained on the cloudcache (110). Alternately, if it is determined that the Csets have delete records, such corresponding data blocks are removed from the cloudcache (110). Here, before removing the data block from the cloudcache (110) it is verified if the data block is synced to the object storage (102). If it is determined that the data block is not synced to the object storage (102), then compaction is skipped and an attempt to compact the block may be attempted again in a next compaction cycle.

In an embodiment, a workflow for block compaction is explained hereinbelow. An overall snapshot retention policy for the Csets is implemented herein. According to the snapshot retention policy, a snapshot retires over a period of time. In an embodiment, data blocks that are only present in retired snapshots are deleted by Cset compaction. A workflow for removal of such blocks from cloudcache is explained hereinbelow.

In Cset compaction, a data block is determined to be compacted and is removed from the object storage (102), further using deduplication index (124) it is determined to be present on the cloudcache (110). In the cloudcache merge index (122), a HandleInfo of the corresponding data block is changed to "purged", when the block is removed from the object storage (122). Hence, as per the cache compaction workflow, a list of "purged" blocks is fetched and all such blocks are removed from the cloudcache (110).

Figure 2:
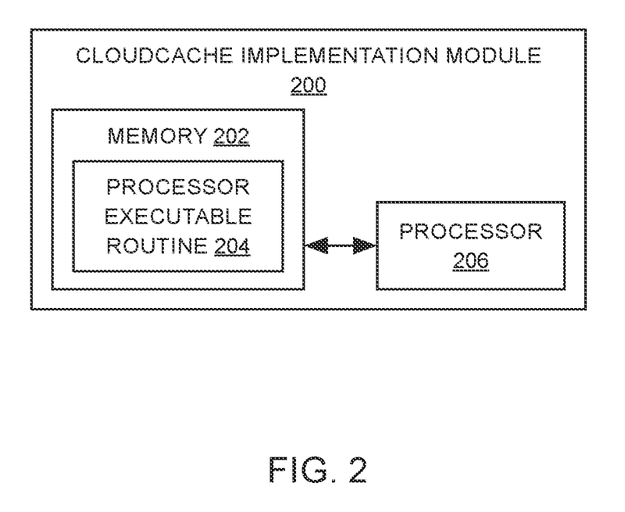
FIG. 2 is a schematic block diagram of a cloudcache implementation module, according to some aspects of the present description.

FIG. 2 is a schematic block diagram of an example cloudcache implementation module (200) such as employed in the file system 100 of FIG. 1. The cloudcache implementation module (200) comprises a memory (202) that is configured to store one or more processor-executable routine(s) (204) and a processor (206) communicatively coupled to the memory (202). The processor 206 is configured to execute one or more processor-executable routine(s) (204) to access a file storage system 100 having plurality of consistency sets (Cset) such as represented by reference numerals 118-A to 118-N. Here, each Cset has snapshots of a file storage system of a client, and each snapshot includes one or more data blocks. The processor (206) further, accesses a cloudcache (110) located on a premises (112) of the client and receives an instruction to implement a workflow between the object storage (102) and the cloudcache (110). Typically, the workflow is selected to facilitate one of data backup, data restore, cloud sync and data compaction between the object storage (102) and the cloudcache (110). Further, the processor (206) is configured to access one or more entities corresponding to the plurality of Csets, wherein the one or more entities comprise a Cset index, a cloudcache merge index and a deduplication index. Each of the Cset index, cloudcache merge index and deduplication index includes a plurality of metadata records. The cloudcache implementation module (200) implements an identified workflow between the object storage and the cloudcache (110) using the Cset index, cloudcache merge index and the deduplication index in accordance with a data retention policy of the client.

Furthermore, the processor (206) is configured to execute the one or more processor-executable routines to implement the data backup workflow. In the data backup workflow, the processor (206) receives data blocks corresponding to one or more files of the Csets. The processor (206) identifies if each of the received data blocks is a fresh block or a dedup block using the deduplication index, where the deduplication index comprises information about whether data blocks are present on the cloudcache (110) or the object storage (102). Further, the processor (206) assigns a new handle for identified fresh data blocks; and uploads data for the data blocks against corresponding handles on the cloudcache (110).

Further, the processor (206) is configured to implement the data restore workflow. In this workflow, the processor (206) is configured to receive one or more folders, corresponding files, and block map for a restore operation. The processor (206) is configured to identify, if each of the received data blocks is present on the cloudcache (110) or the object storage (102) based upon the deduplication index, and downloads identified data blocks accordingly, from the cloudcache (110) or the object storage (102). In an embodiment, the processor (206) is configured to implement a cloudsync workflow. In the cloudsync workflow, the processor (206) is configured to review an unsynced block list for all handles to determine if one or more data blocks are available on the object storage (102) based on a handle identification and uploads the data block to the object storage (102) if the data block is determined as not available on the object storage (102) and deletes an unsynced block record for the corresponding handle. Further, the processor (206) deletes the unsynced block record for the handle for data blocks that are determined to be available on the object storage (102).

Figure 3:
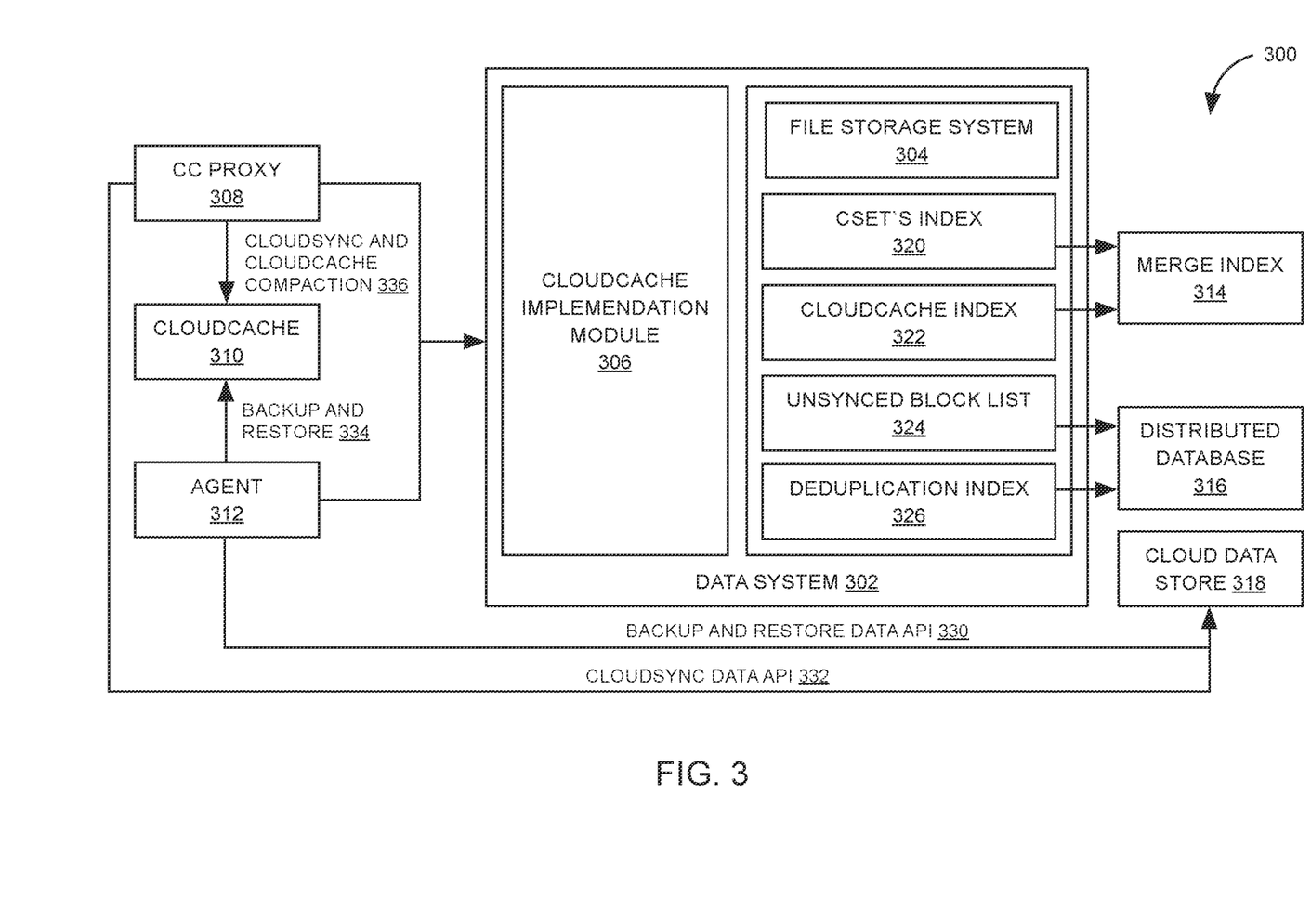
FIG. 3 illustrates a workflow environment illustrating a workflow between a file storage system and a cloudcache, according to some aspects of the present description.

FIG. 3 is a schematic block diagram of a cloudcache-based system (300) illustrating a workflow of data between a cloudcache (310) and a file storage system (304), according to some aspects of the present description. In an embodiment, the cloudcache-based system (300) includes a data system (302), a file storage system (304), a cloudcache implementation module (306) that includes an application programming interface (API) server, a cloudcache (CC) proxy (308), a cloudcache (310), an agent (312), a merge index (314), a distributed database (316), and a cloud data store (318).

The data system (302) includes the file storage system (304) and the API server (306). The file storage system (304) includes a Cset index (320), a cloudcache merge index (322), an unsynced block list (324) and a deduplication index (326). The merge index (314) stores data received from the Cset index (320) and the cloudcache merge index (322). The distributed database (316) stores data received from the unsynced block list (324) and the deduplication index (326). The file storage system (304) is communicatively coupled with the cloudcache implementation module (306) through a wired medium or a wireless medium. The cloudcache (310) communicates with the CC Proxy (308) for performing the cloudsync and cloudcache compaction (336). The cloudcache (310) communicates with the agent (312) for performing backup and restore operations (334). The agent (312) is coupled with the cloud data store (318) through a backup and restore data API (330). The CC proxy (308) is coupled with the cloud data store (318) through a cloudsync data API (332).

The cloudcache (310) is installed on a client premises and has a limited amount of storage. In order to support backup and restore to/from the cloudcache (310), different workflows have been developed with respect to the proposed implementation. Multiple Csets with different cloudcache retention policy can be attached to a single cloudcache.

List of workflows of the cloudcache-based system (300) are described below:
1. Backup: The agent (312) is configured to upload data blocks to the cloudcache (310).
2. Restore: The agent (312) is configured to download the data blocks from the cloudcache (310) and cloud data store (318).
3. CloudSync: Data blocks from the cloudcache (310) are uploaded/sync to the object storage to ensure data blocks are downloadable from the object storage as well.
4. Expiry Compaction: As the Cloudcache (310) has limited amount of storage, based on cloudcache Retention policy of each Cset attached to the cloudcache (310), expired blocks are cleaned up from the cloudcache (310) on condition that its available to download from the object storage.
5. Block Compaction on Cloud: Data blocks purged on the filesystem (304) are cleaned from the cloudcache (310) without requiring them to be present on the object storage.

In some embodiments, each Cset has a separate merge-index but they may share the same cloudcache merge-index (322). In an example, for the cloudcache merge-index (322), below listed primary metadata records are stored. Additional details about these are available in U.S. patent application Ser. No. 18/095,818 filed on Jan. 11, 2023, entitled "Object Storage-Based Indexing Systems and Method" which is incorporated herein by reference in its entirety unless directly contradictory to the embodiments described herein.

Cset Handle Ref
1. Key: CsetID+Handle
2. Value: N/A
3. VersionInfo: In this embodiment, the merge index allows storing multiple versions of a record (key). Each version is identified by a unique VersionInfo.
    A. Version number(ver): snapshot's version of the event
    B. Seq number(seq): monotonically increasing counter
    C. Operation type(optype): Operation done on the ref
        I. Create: record created at this version
        II. Delete: record deleted at this version The metadata records such as described above facilitate in efficiently identifying all Handles referenced in a Cset during Cset Compaction workflow.

Handle Cset Ref
1. Key: Handle+CsetID
2. Value: N/A
3. VersionInfo
    A. Version number(ver): snapshot's version of the event
    B. Seq number(seq): monotonically increasing counter
    C. Operation type(optype): Operation done on the ref
        I. Create: record created at this version
        II. Delete: record deleted at this version In this embodiment, such metadata may help to identify all Csets in which a handle is present.

Handle Info State
1. Key: Handle
2. Value: N/A
3. VersionInfo:
    A. Version number(ver): N/A
    B. Seq number(seq): monotonically increasing counter
    C. Operation type(optype): Operation done on handle
        I. Unsynced: indicates block is uploaded to CC but not yet synced to Cloud
        II. Free: indicates block is synced to Cloud from CC
        III. Purged: block no longer required in storage system
        IV. Finished: denotes all operation for handle is completed and the block is removed from CC The metadata described above may help in lifecycle management of a handle In an example, for a distributed database index, following records are maintained for the cloudcache (310):—

Unsynced Block List:
    A. Key: CloudcacheID+epochTime+seqID
    B. Value: List of Handles
    C. Purpose: Track the list of handles sorted by EpochTime to be synced to Cloud D. Terminology: SeqID: Unique identifier to distinguish between multiple Backup APIs creating a unsynced record entry at same epochTime In the distributed database, following records are maintained for a Cset:—

1. Snapshot:
   A. Key: version number
   B. Value:
      I. Snapshot creation time
      II. Status: Active/Deleted In the distributed database, following records are maintained for a Storage 1. Handle Record:
   A. Key: Handle
   B. Value:
      I. OnCache: True, indicates present on the Cloudcache (310).
      II. OnCloud: True, indicates present on the Cloud.

Such records may facilitate block to block-handle mapping and tracking block presence on the cloudcache (310) or the object storage (102) or both.

Backup workflow with the cloudcache (310): Below operations are basic backup workflow:

1. The agent (312) is configured to send the file and its data for backup in the chunks.
2. The agent (312) is configured to search the deduplication index to determine if it's a fresh block or Dedup block.
3. In case of the Fresh block, new Handle is returned against each chunk.
4. In case of Dedup block, no Handle is assigned as block is already present.
5. The agent (312) is configured to upload data of each chunk against corresponding Handle on the cloudcache (310).
6. The agent (312) commits the snapshot.

In an example, for the fresh block, following records are created for cloudcache databases:

1. Cloudcache merge-index (322): Both Handle Cset and Cset Handle ref entry with optype=Create and ver=snapshot's version and Handle Info state with key=Handle and optype=Unflushed
2. Cloudcache distributed database (324): Unsynced list for all handles which were uploaded to cloudcache In an example, for the Dedup block, following records are created for Cloudcache databases:

1. Cloudcache merge-index (322): Both Handle Cset and Cset Handle ref entry with optype=Create and ver=snapshot's version In an example of the file system (304) for a Cset(id=15) with Cloudcache(id=2) retention policy of 20 days having 2 snapshots:—

In an example, first snapshot: File xyz.pdf was created. It has 2 blocks of size 1 MB each. The snapshot's Creation Time=now-30 days In another example, a second Snapshot: First block of the above file was modified. The Snapshots's Creation Time=now-10 days In an example, below are the metadata records for the Cset.

Directory Entry

Parent = /folder, File name = $xyz.pdf$, $ver = 2$, $seq = 20$, $optype$ = Create Value = {Size: 2 MB, ...}

Parent = /folder, File name = $xyz.pdf$, $ver = 1$, $seq = 10$, $optype$ = Create Value = {Size: 2 MB, ...}

Block Map

Path = /folder/$xyz.pdf$, Offset = 0 MB, $ver = 2$, $seq = 19$, $optype$ = Create, Value = {Handle: 2105, Size: 1 MB}

Path = /folder/$xyz.pdf$, Offset = 0 MB, $ver = 1$, $seq = 8$, $optype$ = Create, Value = {Handle: 1012, Size: 1 MB}

Path = /folder/$xyz.pdf$, Offset = 1 MB, $ver = 1$, $seq = 9$, $optype$ = Create, Value = {Handle: 1013, Size: 1 MB}

Local Reference

Handle = 1012, Path = /folder/$xyz.pdf$,

Offset = 0 MB, $ver = 1$, $seq = 8$, $optype$ = Create

Handle = 1013, Path = /folder/$xyz.pdf$,

Offset = 1 MB, $ver = 1$, $seq = 9$, $optype$ = Create

Handle = 2105, Path = /folder/$xyz.pdf$,

Offset = 0 MB, $ver = 2$, $seq = 19$, $optype$ = Create

Snapshot

Version = 1, timestamp = Now − 30 days, status = "Active"

Version = 2, timestamp = Now − 10 days, status = "Active"

Handle IDInfo

Handle = 1012, $OnCache$ = True, $OnCloud$ = False

Handle = 1013, $OnCache$ = True, $OnCloud$ = False

Handle = 2105, $OnCache$ = True, $OnCloud$ = False

In an example, below are the metadata records for the Cloudcache (310).

Handle Info State

Key = 1012, $ver = 0$, $seq = 1$, $optype$ = Unflushed

Key = 1013, $ver = 0$, $seq = 1$, $optype$ = Unflushed

Key = 2105, $ver = 0$, $seq = 2$, $optype$ = Unflushed

Handle Cset Ref

Key = 1012, CsetID = 15, ver = 1, seq = 5, optype = Create

Key = 1013, CsetID = 15, ver = 1, seq = 6, optype = Create

Key = 2105, CsetID = 15, ver = 2, seq = 12, optype = Create

Cset Handle Ref

CsetID = 15, Key = 1012, ver = 1, seq = 5, optype = Create

CsetID = 15, Key = 1013, ver = 1, seq = 6, optype = Create

CsetID = 15, Key = 2105, ver = 2, seq = 12, optype = Create

Unsynced List

CCID = 2, EpochTime = now − 30 days, Handles = [1012]

CCID = 2, EpochTime = now − 30 days, Handles = [1013]

CCID = 2, EpochTime = now − 10 days, Handles = [2105]

Restore workflow with the cloudcache (310): Below are the basic restore workflow operations:

a. The agent (312) fetches the folders, the files and its Block map for a snapshot from the server (e.g., API server).

b. For each block, the agent (312) checks the deduplication index to determine if the block is present on the cloudcache (310) or the cloud (318)

c. If the block is present on the cloudcache (310), the agent (312) downloads data from the cloudcache (310)

d. If the block is present on the Cloud, the agent (312) downloads data from the Cloud For given example, restore of snapshot1: the agent (312) fetches the list of files and its blocks from the server (306) i.e. /folder, and/folder/xyz.pdf and its two block maps In deduplication index, Handle IDInfo states is:—
Handle IDInfo Handle = 1012, OnCache = True, OnCloud = False Handle = 1013, OnCache = True, OnCloud = False Handle = 2105, OnCache = True, OnCloud = False For handles 1012 and 1013 corresponding to two block maps for /folder/xyz.pdf, Handle IDInfo indicates its presence on the cloudcache (310) so that the agent (312) downloads blocks from the cloudcache (310).

CloudSync workflow with cloudcache (310): All data uploaded to the cloudcache (310) is synced to the cloud/object storage during non-core hours to ensure snapshots are always restorable from the cloud as well. Below are the details of workflow: in the workflow, the CC Proxy (308) interacts with the API server to fetch list of blocks, read those blocks from the cloudcache (310) and upload to the cloud data store (318).

1. Walk over unsynced block list records
2. For each handle, read Handle IDInfo record,
   A. If OnCloud is False
      I. Upload block to the cloud
      II. Set OnCloud to True
      III. Create Handle State Info record with optype=Free and key=Handle in Cloudcache merge-index record
      IV. Delete unsynced block record for handle
   B. If OnCloud is True
      I. Delete unsynced block record for handle For given example, following metadata records are updated:
Unsynced List ~~CCID = 2, EpochTime = now 30 days, Handles = [1012]~~ ~~CCID = 2, EpochTime = now 30 days, Handles = [1013]~~ ~~CCID = 2, EpochTime = now 10 days, Handles = [2105]~~

Handle IDInfo

Handle = 1012, OnCache = True, OnCloud = True

Handle = 1013, OnCache = True, OnCloud = True

Handle = 2105, OnCache = True, OnCloud = True

Handle State Info

Key = 1012, ver = 0, seq = 3, optype = Free

Key = 1012, ver = 0, seq = 1, optype = Unflushed

Key = 1013, ver = 0, seq = 3, optype = Free

Key = 1013, ver = 0, seq = 1, optype = Unflushed

Key = 2105, ver = 0, seq = 3, optype = Free

Key = 2105, ver = 0, seq = 2, optype = Unflushed

Cloudcache compaction workflow with cloudcache (310): A Cloudcache compaction workflow has two steps:

1. Cset Compaction: Based on Cset cloudcache retention policy, the system identifies all handles eligible for compaction from the cloudcache (310) and creates a delete record in the cloudcache merge-index (322).
2. Cloudcache Block Compaction: Walk over cloudcache merge-index (322), the system identifies all handles which are not present for all of the Cset and purge from cloudcache (310) only when its available for download from the Cloud.

In certain embodiments, additional steps are incorporated for the Cset compaction workflow. Here, it is determined if the cut-off version is based on Cset's cloudcache retention policy. For the given example, Cset's cloudcache retention policy is 20 days. So, all blocks present only in Snapshot 1 are eligible for compaction from the cloudcache (310). In this example, the cut-off version is 2.

Mark delete phase: For a Bmap entry, the file system (304) identifies its lifespan and creates a Delete record in the local reference. For the given example, the merge index for Cset will have the following records. Additional details about these are available in U.S. patent application Ser. No. 18/095,825, filed on Jan. 11, 2023, entitled "Data Compaction Systems and Method" which is incorporated herein by reference in its entirety unless directly contradictory to the embodiments described herein Entries in bold are newly added.

Local Ref

Handle = 1012, Path = /folder/xyz.pdf, Offset = 0 MB, ver = 2, seq = 19, optype = Delete

Handle = 1012, Path = /folder/xyz.pdf, Offset = 0 MB, ver = 1, seq = 8, optype = Create Handle = 1013, Path = /folder/xyz.pdf, Offset = 1 MB, ver = 1, seq = 9, optype = Create Handle = 2105, Path = /folder/xyz.pdf, Offset = 0 MB, ver = 2, seq = 19, optype = Create Data block purge phase on the server side includes the below mentioned steps;
1. Walk over Cset's local-ref index and cloudcache's Cset handle ref index together.
2. For each handle determine its lifespan based on local-ref index.
3. If handle is present on the cloudcache (310) and its life span is till cut off version, add the delete record in both handle cset and cset handle ref.
4. If handle is being purged from cloud, check if its present on the cloudcache (310).
5. If present, add the handle info record with key=Handle and optype=Purged in CC merge-index For the given example, the merge index for cloudcache (310) will have the following records. Entries in bold are newly added.

Handle State Info

Key = 1012, ver = 0, seq = 3, optype = Free

Key = 1012, ver = 0, seq = 1, optype = Unflushed

Key = 1013, ver = 0, seq = 3, optype = Free

Key = 1013, ver = 0, seq = 1, optype = Unflushed

Key = 2105, ver = 0, seq = 3, optype = Free

Key = 2105, ver = 0, seq = 2, optype = Unflushed

Handle Cset Ref

Key = 1012, CsetID = 15, ver = 2, seq = 25, optype = Delete

Key = 1012, CsetID = 15, ver = 1, seq = 5, optype = Create

Key = 1013, CsetID = 15, ver = 1, seq = 6, optype = Create

Key = 2105, CsetID = 15, ver = 2, seq = 12, optype = Create

Cset Handle Ref

CsetID = 15, Key = 1012, ver = 2, seq = 25, optype = Delete

CsetID = 15, Key = 1012, ver = 1, seq = 5, optype = Create

CsetID = 15, Key = 1013, ver = 1, seq = 6, optype = Create

CsetID = 15, Key = 2105, ver = 2, seq = 12, optype = Create

Moreover, an example of cloudcache block compaction workflow is described below. This workflow may be performed by CC Proxy(308) in interaction with API serve and cloudcache (310) and the steps are listed below
1. Walk over handle state info and handle Cset ref index
2. For the Handle, if all its Cset references are in deleted state, then its eligible for compaction from the cloudcache (310).
   A. If Handle state info indicates Free (uploaded to the Cloud)
      I. Purge such block from cloudcache
      II. Update Handle IDInfo OnCache state to False
      III. Create Handle State Info entry with optype=Finished
   B. If Handle state info indicates Unflushed (not yet uploaded to the Cloud).
      I. Ignore in this cycle and try again in next cycle
3. For a Handle, if Handle state info indicates Purged (block purged on the filesystem (304)), such blocks are purged from the cloudcache (310) without requiring them to be present on the object storage.

For the given example, the merge index for cloudcache (310) will have the following records. Entries in bold are newly added or updated.

Handle IDInfo

Handle = 1012, OnCache = False, OnCloud = True

Handle = 1013, OnCache = True, OnCloud = True

Handle = 2105, OnCache = True, OnCloud = True

Handle State Info

Key = 1012, ver = 0, seq = 4, optype = Finished

Key = 1012, ver = 0, seq = 3, optype = Free

Key = 1012, ver = 0, seq = 1, optype = Unflushed

Key = 1013, ver = 0, seq = 3, optype = Free

Key = 1013, ver = 0, seq = 1, optype = Unflushed

Key = 2105, ver = 0, seq = 3, optype = Free

Key = 2105, ver = 0, seq = 2, optype = Unflushed

Handle Cset Ref

Key = 1012, CsetID = 15, ver = 2, seq = 25, optype = Delete

Key = 1012, CsetID = 15, ver = 1, seq = 5, optype = Create

Key = 1013, CsetID = 15, ver = 1, seq = 6, optype = Create

Key = 2105, CsetID = 15, ver = 2, seq = 12, optype = Create

Cset Handle Ref

CsetID = 15, Key = 1012, ver = 2, seq = 25, optype = Delete

CsetID = 15, Key = 1012, ver = 1, seq = 5, optype = Create

-continued

CsetID = 15, Key = 1013, ver = 1, seq = 6, optype = Create

CsetID = 15, Key = 2105, ver = 2, seq = 12, optype = Create

In an embodiment, the cloudcache-based system (300) is configured to restore files, folders, virtual machine images, or combinations thereof.

Figure 4:
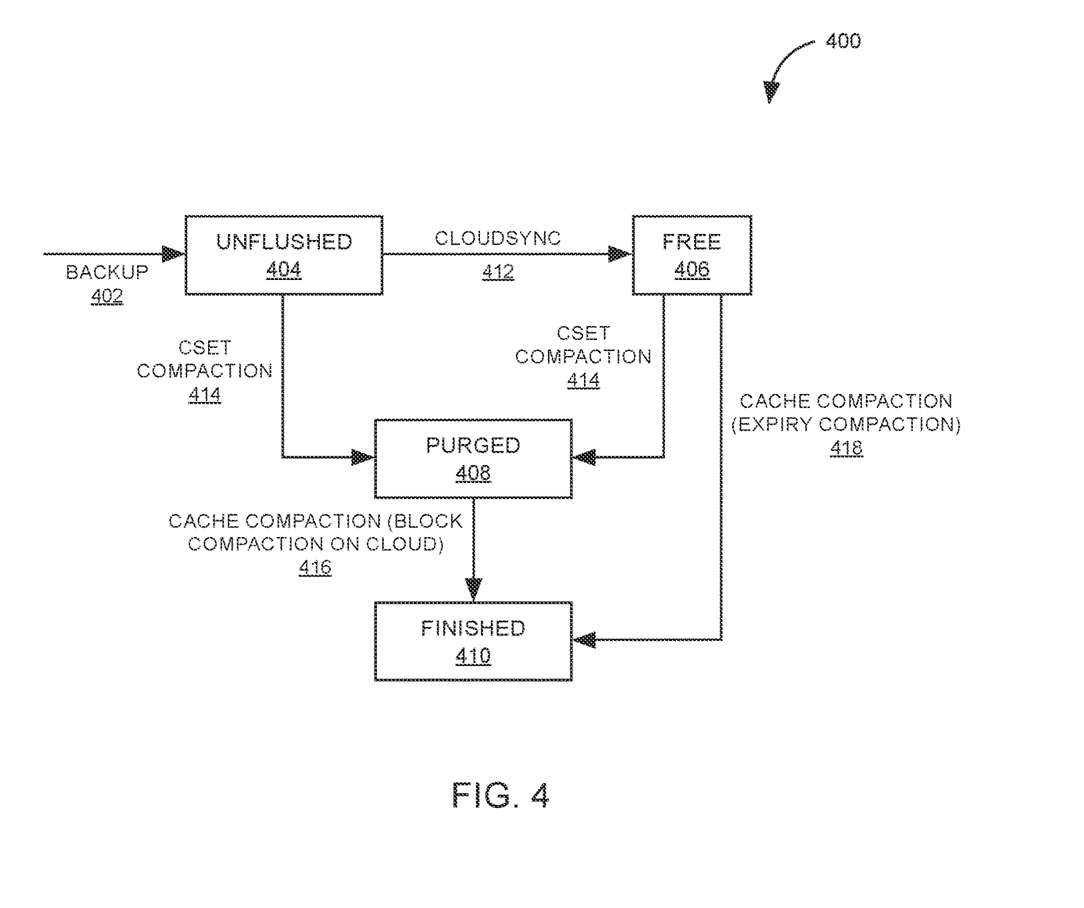
FIG. 4 is an example transition diagram for operation type states associated with the cloudcache and the file storage system, according to some aspects of the present description.

FIG. 4 is an example transition diagram (400) for operation type states associated with the cloudcache-based system (300) for the file system (304), according to some aspects of the present description. As can be seen, the states include unflushed (404), free (406), purged (408), and finished (410) during the various workflows that include the backup 402, cloudsync (412), Cset compaction (414), cache compaction or block compaction on cloud (416) and cache compaction or expiry compaction (418).

The various states illustrated in FIG. 4 are described herein. The state "unflushed" (404) indicates that a data block is uploaded to the cloudcache by agent and is not yet synced to cloud. In addition, the state "free" (406) indicates that the cloudsync workflow has uploaded the data block to the cloud/object storage. Here, the data block is still present on the cloudcache for efficient restore purpose. Moreover, the state "purged" (408) refers to the state where the Cset workflow determines that the block is deleted from the file system as the corresponding snapshots are compacted. Further, the state "finished" (410) refers to a state where the block transitions to finished state once it is removed from cloudcache. Block could be removed due to cloudcache retention policy of removing old data blocks or as a result of removal from the file system.

Figure 5:
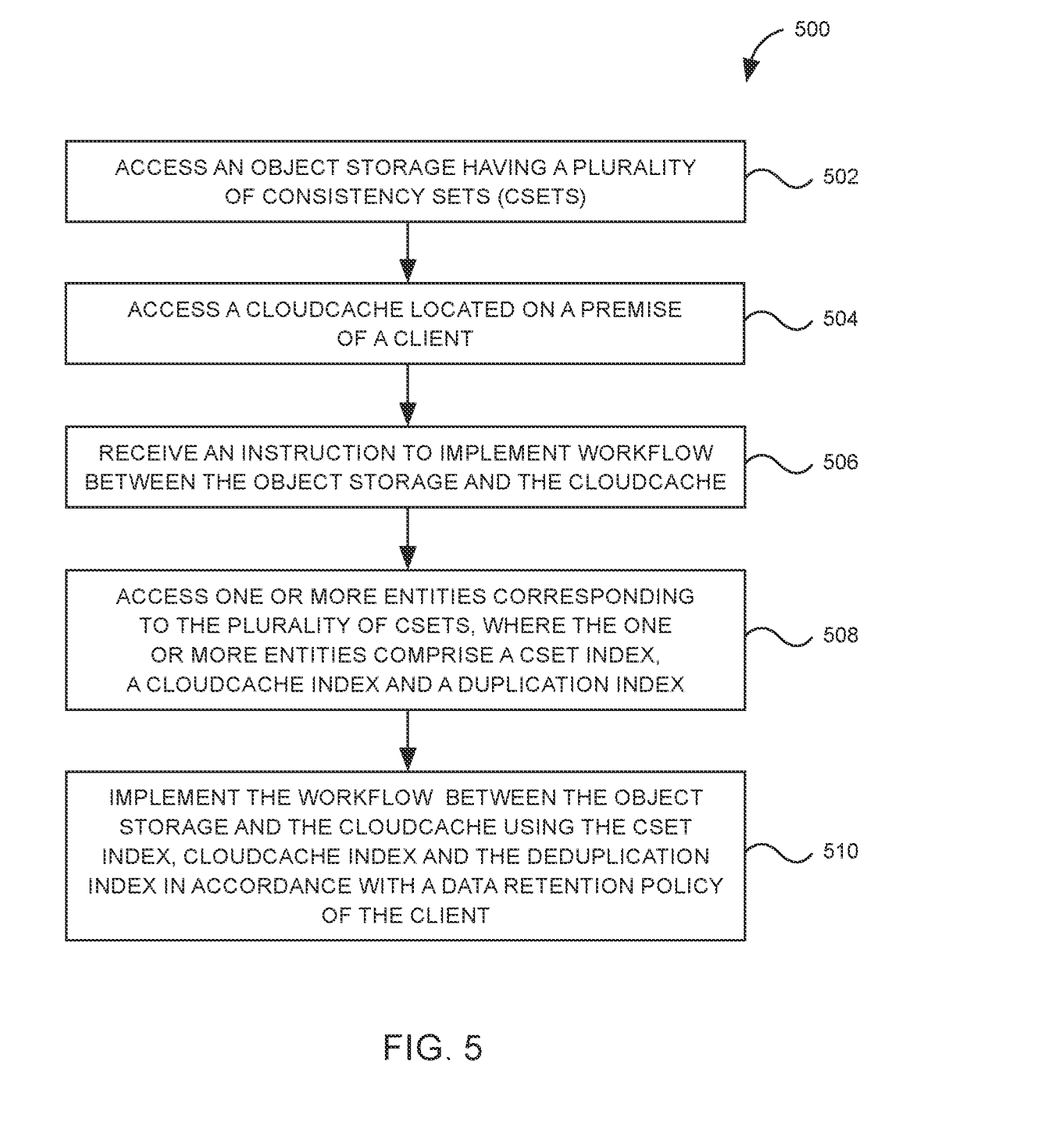
FIG. 5 is a flowchart of a method for implementing a data workflow between a file storage system and a cloudcache, according to some aspects of the present description.

FIG. 5 is a flowchart (500) of a method for implementing a data workflow between a file storage system and a cloudcache, according to some aspects of the present description.

At 502, an object storage is accessed having a plurality of consistency sets (Csets), where each Cset has snapshots of the file system. Generally, each snapshot comprises one or more data blocks.

At 504, a cloudcache located on premises of the client is accessed. The cloudcache is communicatively coupled to a cloudcache implementation module installed within the file storage system.

At 506, an instruction is received to implement a workflow between the object storage and the cloudcache, where the workflow is selected to facilitate one of a data backup, a data restore, a cloud sync and a data compaction between the object storage and the cloudcache.

At 508, the one or more entities are accessed corresponding to the plurality of Csets, where the one or more entities comprise Cset index, a cloudcache merge index, and a deduplication index. Typically, each of the Cset index, a cloudcache merge index, and the deduplication index has a plurality of metadata records.

At 510, the workflow is implemented between the object storage and the cloudcache using the Cset index, the cloudcache merge index, and the deduplication index in accordance with a data retention policy of the client. One of the workflows include a data backup workflow. The data backup workflow includes receiving data blocks corresponding to one or more files of the Csets, identify if each of the received data blocks is a fresh block or a dedup block using the deduplication index. In an embodiment, the deduplication index comprises information about whether data blocks are present on the cloudcache or the object storage. Further, a handle is assigned for identified fresh data blocks and data for the data blocks is uploaded against corresponding handles on the cloudcache.

Another workflow includes the data restore workflow. The data restore workflow includes receiving one or more folders, corresponding files and block map for a restore operation. The data restore workflow includes identifying if each of the received data blocks is present on the cloudcache or the object storage based upon the deduplication index. The method further includes downloading identified data blocks accordingly from the cloudcache or the object storage. Another workflow includes implementing the cloudsync workflow. The cloudsync workflow includes reviewing unsynced block list for all handles to determine if one or more data blocks are available on the object storage based on a handle identification. Further, the cloudsync workflow includes uploading the data block to the object storage if the data block is determined as not available on the object storage and delete the unsynced block record for the corresponding handle. Further, the unsynced block record is deleted for the handle for data blocks that are determined to be available on the object storage.

According to embodiments of the present description, a source data storage (not shown) can include a cloud storage where data blocks are stored on a storage server, e.g., an object-based store like AWS S3. The metadata is the additional information maintained to allow restore of backed up data back into its original form. A database on the storage server is used to store the metadata. Non-limiting example of a metadata database includes a NoSQL database such as AWS DynamoDB.

Non-limiting examples of metadata records stored in NoSQL DB include deduplication indexes, snapshots, usage counters, and the like.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The modules of the system (100) for performing antivirus scan on a virtual machine, described herein are implemented in computing devices. One example of a computing device (600) is described below in FIG. 6. The computing device (600) includes one or more processor(s) (602), one or more computer-readable RAMs (604) and one or more computer-readable ROMs (606) on one or more buses (608). Further, computing device (600) includes a tangible storage device (610) that may be used to execute operating systems (620) and the file storage system (100). The various modules of the file storage system (100) may be stored in the tangible storage device (610). Both, the operating systems (620) and the file storage system (100) are executed by the one or more processor(s) (602) via one or more respective RAMs (604) (which typically include cache memory). The execution of the operating systems (620) and/or the file storage system (100) by the one or more processor(s) (602), configures the one or more processor(s) (602) as a special purpose processor configured to carry out the functionalities of the operation systems (620) and/or the online platform system (100) as described above.

Figure 6:
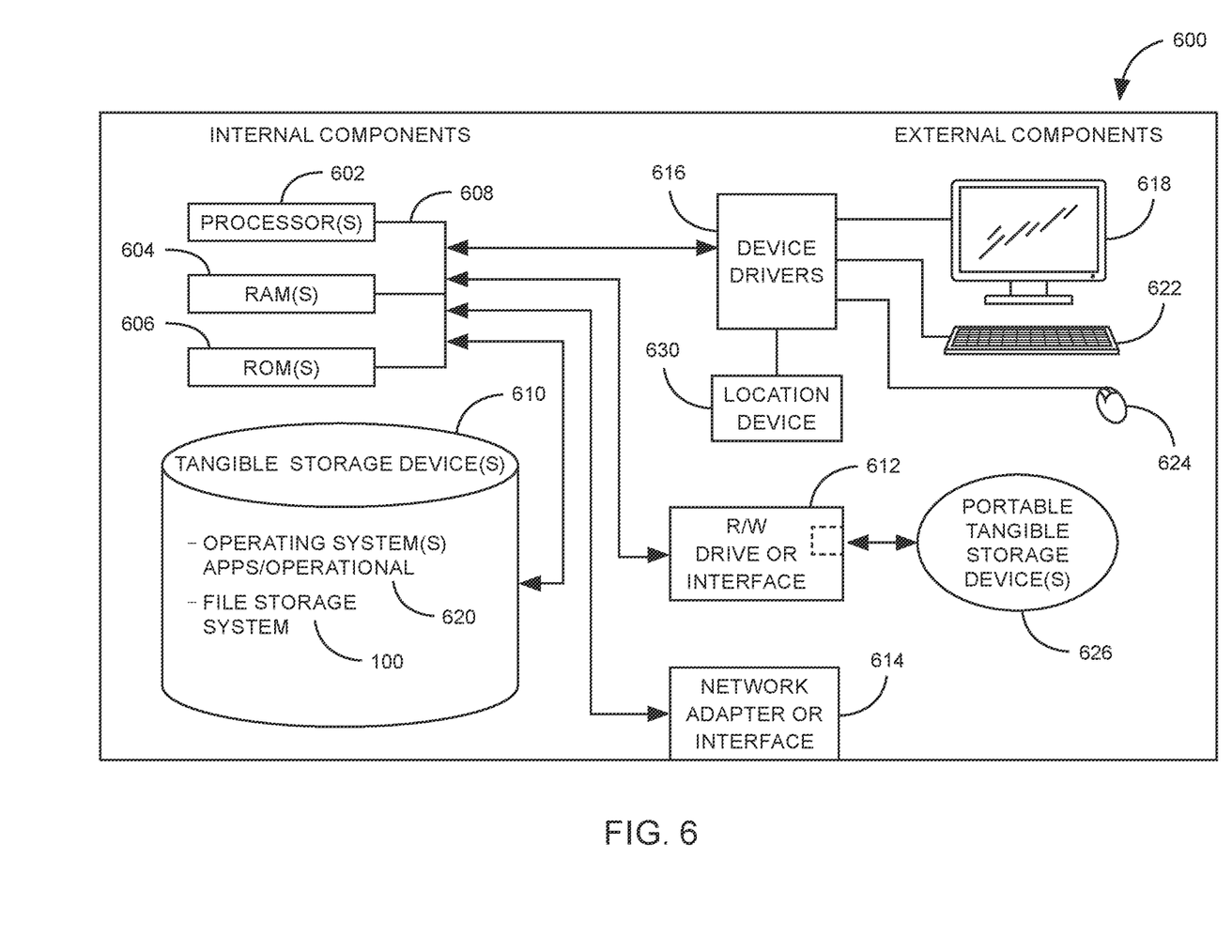
FIG. 6 is a block diagram of an embodiment of a computing device in which the modules of the file storage system, described herein, are implemented.

Examples of the tangible storage device (610) include semiconductor storage devices such as ROM, EPROM, flash memory or any other computer-readable tangible storage device that may store a computer program and digital information.

Computing device (600) also includes a R/W drive or interface (612) to read from and write to one or more portable computer-readable tangible storage devices (626) such as a CD-ROM, DVD, memory stick or semiconductor storage device. Further, network adapters or interfaces (614) such as a TCP/IP adapter cards, wireless Wi-Fi interface cards, or 3G or 4G wireless interface cards or other wired or wireless communication links are also included in computing device.

In one example embodiment, the file storage system (100) may be stored in the tangible storage device (610) and may be downloaded from an external computer via a network (for example, the Internet, a local area network or other, wide area network) and network adapter or interface (614).

Computing device (600) further includes device drivers (616) to interface with input and output devices. The input and output devices may include a computer display monitor (618), a keyboard (622), a keypad, a touch screen, a computer mouse (624), and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

What is claimed is:

1. A cloudcache implementation module for an object storage-based file system of a client, the cloudcache implementation module comprising:
    a computer memory storing one or more processor-executable routines; and
    a computer processor communicatively coupled to the memory, wherein the one or more computer processor-executable routines to, when executed by the processor, cause the cloudcache implementation module to:
    access an object storage comprising a plurality of consistency sets (Csets), each Cset having snapshots of the file system, wherein each snapshot comprises one or more data blocks, wherein the object storage further comprises a merge index database configured to store metadata corresponding to the stored data blocks using a merge index;
    access a cloudcache located on premises of the client;
    receive an instruction to implement a workflow between the object storage and the cloudcache, wherein the workflow is selected to facilitate one of data backup, data restore, cloud sync and data compaction between the object storage and the cloudcache;

access one or more entities corresponding to the plurality of Csets, wherein the one or more entities comprise Cset index, a cloudcache index, and a deduplication index, wherein each of the Cset index, cloudcache index, and deduplication index comprise a plurality of metadata records;

receive data blocks corresponding to one of more files;

identify if each of the received data blocks is a fresh block or a dedup block using the deduplication index, wherein the deduplication index comprises information about whether data blocks are present on the cloudcache or the object storage;

assign a new handle for identified fresh data blocks;

upload data for the data blocks against corresponding handles on the cloudcache; and implement the workflow between the object storage and the cloudcache using the Cset index, cloudcache index, merge index, and the deduplication index in accordance with a data retention policy of the client, wherein the cloudcache implementation module is configured to create handle references in the merge index for each of the fresh and dedup blocks, and each merge index comprises a Handle Cset reference, a Cset Handle reference, a Handleinfo state, or combinations thereof.

2. The cloudcache implementation module of claim 1, wherein the workflow is a data restore workflow and the one or more processor-executable routines further cause the cloudcache implementation module to:

receive one or more folders, corresponding files, and block map for a restore operation;

identify if each of the received data blocks is present on the cloudcache or the object storage based upon the deduplication index; and download identified data blocks accordingly from the cloudcache or the object storage.

3. The cloudcache implementation module of claim 1, wherein the workflow is a cloudsync workflow and the one or more processor-executable routines further cause the cloudcache implementation module to:

review an unsynced block list for all handles to determine if one or more data blocks are available on the object storage based on a handle identification;

upload the data block to the object storage if the data block is determined as not available on the object storage and delete the unsynced block record for the corresponding handle; and delete the unsynced block record for the handle for data blocks that are determined to be available on the object storage.

* * * * *